United States Patent
Molnar et al.

(10) Patent No.: US 7,327,695 B2
(45) Date of Patent: Feb. 5, 2008

(54) CENTRALIZED LINK-SCOPE CONFIGURATION OF AN INTERNET PROTOCOL (IP) NETWORK

(75) Inventors: Gergely Molnar, Budapest (HU); Gábor Tóth, Szigetszentmiklós (HU); Balázs Peter Gerö, Pécs (HU); Attila Rajmund Nohl, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 846 days.

(21) Appl. No.: 10/742,731

(22) Filed: Dec. 19, 2003

(65) Prior Publication Data

US 2005/0135274 A1    Jun. 23, 2005

(51) Int. Cl.
*H04L 12/28* (2006.01)

(52) U.S. Cl. .................. 370/255; 370/254; 370/256

(58) Field of Classification Search ............ 370/254, 370/255, 256
See application file for complete search history.

(56) References Cited

U.S. PATENT DOCUMENTS 6,621,798 B1 * 9/2003 Krishnan et al. ........... 370/256
6,898,183 B1 * 5/2005 Garakani .................... 370/238
6,944,130 B1 * 9/2005 Chu et al. ................. 370/238.1

OTHER PUBLICATIONS

P. Krishnan, et al., "Sequencing of Configuration Operations for IP Networks", Proceedings of the 14th Systems Administration Conference (LISA 2000), Dec. 3-8, 2000, pp. 265-274, USENIX Association, New Orleans, Louisiana, USA.

* cited by examiner

Primary Examiner—Wellington Chin
Assistant Examiner—Mark A. Mais

(57) ABSTRACT

A method of configuring link-scope-type managed objects in IP-based networks from a centralized management node. An IP-based network includes at least one management station, a set of network nodes, and communication links between the network nodes and between the management station and the network nodes. Preferably, an Open Shortest Path First (OSPF) topology graph of the network is prepared, and a set of target links to be configured is identified. The target links are then classified into N disjoint subsets, $T_1$-$T_N$. The links in each subset are then configured in parallel, starting with subset $T_1$ and sequentially handling each subset one-by-one. The target links may be classified by removing non-target links that are not to be configured from the OSPF topology graph, building a LinkGraph to determine the dependencies between the links remaining in the OSPF topology graph, and building a LinkTree from the LinkGraph to classify the target links into the subsets based upon the dependencies between the links.

9 Claims, 9 Drawing Sheets

OSPF TOPOLOGY GRAPH

LINKGRAPH

CONSTRUCTION OF LINKTREE

PARALLEL CONFIGURABLE LINKS ($T_1$)

OSPF TOPOLOGY GRAPH OF NEIGHBORING LINKS

LINKGRAPH
OF
NEIGHBORING
LINKS

PARALLEL
CONFIGURABLE
LINKS ($T_2$)

CENTRALIZED LINK-SCOPE CONFIGURATION OF AN INTERNET PROTOCOL (IP) NETWORK

TECHNICAL FIELD

The present invention relates to Internet Protocol (IP) communication networks. More particularly, and not by way of limitation, the present invention is directed to a method of configuring link-scope-type managed objects in IP-based networks from a centralized management node.

BACKGROUND ART

The Internet Protocol (IP) is a communication protocol that connects hosts independently of their physical connection. In general, IP hosts are computers that include an IP protocol stack and applications. If a set of hosts is connected directly, that is, they are on the same cable, then they can communicate with each other directly. This arrangement is called an IP network or sub-network (or simply IP subnet). When the IP hosts are not connected directly, that is, there are multiple physically separated links, a router is needed to provide IP connectivity between the hosts on the physically separated IP subnets. A router connects different IP subnets. The largest computer network based on IP is the Internet, which consists of a large number of IP subnets connected by routers. When a router connects at least two subnets, the hosts on these subnets can talk to each other through the router. Of course, directly connected hosts on each subnet can talk to each other directly, but when a host on one of the subnets wants to talk to a host on another subnet, the communication traverses through the router. The router itself is a computer with specialized hardware and software optimized for forwarding the received IP packets sent by the hosts.

Routers have many implemented functions that enable them to support various protocols and services, and to perform other functions. Router functions are controlled by variable parameters. A given set of values of these parameters is referred to as a configuration. Configuration management of a single router is referred to as element configuration management, while the current configuration of multiple routers and hosts in a network is referred to as the network configuration. Network configuration management includes planning and setting the operational functions of the network. These functions may include routing protocols, forwarding policies, virtual private networks, some quality of service (QoS) features, and the like. Additionally, there are link-related configurations such as IPoverPPP connections. Each router performs its individual part of the network configuration, such as special attributes of the Layer-1 physical connections, Layer-2 data-link level interfaces, software configuration, element security, and the like.

For a given router, the set of values of these parameters is the router's configuration. Likewise, the union of these sets of router configurations in a network is the network configuration. However, these sets are not disjunctive. The router configuration has some variables that are dependent on other routers in the network, and some variables that are independent of other routers. The variable parameters can be classified as follows:

Router-scope parameters: These parameters are relevant only to the router itself. Changing router-scope parameters has no direct effect on the operation of other routers (for example, changing the hostname of a router, access passwords, routing process id, and the like).

Link-scope parameters: These parameters are relevant to multiple routers connected by a link (which may be a physical link such as a PPPoverSerial connection, or may be a logical link such as, for example, an Open Shortest Path First (OSPF) adjacency connection). Link-scope parameters must have consistent values in the routers connected by the configured links (for example, the OSPF HelloInterval must be the same for adjacent routers for building correct adjacency).

Area-scope parameters: These parameters are relevant for a group of routers belonging to a logical domain or area (for example, the same Autonomous System (AS) number for an AS, or the same OSPF AreaID for an OSPF area).

As noted above, the function of a router is basically to determine where to forward a received IP packet, and to forward the packet to its destination. The forwarding information may be provided to the router using either static or dynamic routing. With static routing, the network administrator manually sets the routes into the routing table of each router. With dynamic routing, the routers use routing protocols to determine the existing routes in the network. The routers maintain their own routing tables using the information determined by the routing protocol.

When there are more than a certain number of routers in a network (for example 4 or 5), the dynamic method may be preferred. This means that a routing protocol is started in each router, and the router is configured to operate properly. One of the commonly used routing protocols in IP networks is the OSPF protocol. Configuration of this protocol can be classified in the same manner as the variable parameters, namely, router-scope, link-scope, and area-scope. Router-scope refers to the process of configuring the OSPF process in a router. Link-scope refers to the process of configuring OSPF links (adjacencies). Area-scope refers to the process of configuring OSPF areas.

In present IP network management, the network administrator does most of the configuration operation manually using one of the following element management methods:

Command Line Interface (CLI): This is the most widely used method for router configuration management. With CLI, the router is accessed via telnet or a console connection, and using a certain command set, the network administrator types commands to retrieve information from the router and to set parameters. CLI command sets can be very large. The best example of CLI is the Cisco CLI, which is the de facto standard.

Configuration file editing: This method is a special use of the CLI method. In this case, the network administrator edits a configuration file that contains a sequence of CLI commands. Then this configuration file is downloaded into the relevant router using the File Transfer Protocol (FTP) or Trivial File Transfer Protocol (TFTP). This process may require some CLI interaction, for example, initiating the download from the router if the router only has an FTP or TFTP client.

Menu-based element manager: There are a few routers that have no CLI interface, but have a menu-driven system that is accessible via telnet or a console connection. The network administrator can see or set the router configuration using this interface. This method is used very rarely.

Simple Network Management Protocol (SNMP): SNMP is an Internet Engineering Task Force (IETF) standard protocol that provides a standard method of element monitoring and configuration. A Management Information Base (MIB) defines managed objects and their attributes. SNMP is a protocol that gets and sets values of these attributes. Several applications use SNMP. There are so-called MIB browsers that simply browse a given MIB, and get or set its attributes on one target router. There are applications that can handle more than one router. However, in practice, SNMP is typically used for monitoring, collecting statistics, and fault management rather than configuration management. One reason for this is that the MIB contains mostly read-only attributes providing statistics. Another reason is that the standard MIB does not cover everything, so many types of routers are better managed by proprietary MIBs rather than the standard ones.

HTTP-based element management: Some types of routers have a web-server service. A HyperText Transfer Protocol (HTTP) browser can access the configuration and other information. The user can retrieve or set parameters on the served HyperText Markup Language (HTML) pages.

Among these element management methods, SNMP is the most usable for an application. CLI is designed for manual configuration management, although it can be modified for use by an application. Configuration file editing can be aided by an application. The menu-based and web-server based methods are not designed for being used by an application. These methods are good only for manual configuration management.

Additionally, there are applications that provide a certain level of network management. These programs can be divided into two basic sets, applications provided by router vendors (for example, Cisco's CiscoWorks), and applications provided by other software developer companies (for example, HP OpenView).

For remote management, the telnet protocol is mostly used for accessing the routers. Telnetting can be done directly to a target router, or indirectly by telnetting to a neighbor router of the target, and then telnetting from the neighbor to the target router. This type of management, however, is totally unaware of the scope of the configuration attributes. There is only one known description of scope-aware configuration, and that is in a document entitled, "Sequencing of Configuration Operation for IP Networks", by P. Krishnan et al., Proceedings of the 14th Systems Administration Conference, LISA 2000 (hereinafter, Krishnan). However, as will be shown below, the Krishnan method is not a sufficient solution.

The most significant characteristic of prior art IP configuration management methods is that each target router is configured one-by-one, independent of each other. The network administrator designs the operation 'in mind' and realizes it by configuring the relevant routers one-by-one. The first step is that the administrator defines the parameters to be changed and the values to be set. These changes are then made on the relevant routers. The first part is logical, and the next part is concrete. Thus, the first step is done in the administrator's mind or on a sheet of paper. Then he does the required element management operations on the relevant routers. Managing link-scope OSPF parameters in this way can lead to configuration cost problems, sequencing problems, lengthy operation times, and problems with cancellation and error handling. Each of these problem areas will be discussed below.

Configuration Cost Problems: OSPF links have link-scope attributes. These attributes are stored in the routers and must have consistent values for proper OSPF adjacency. The logical configuration of an OSPF link needs only to define the values of these link-scope attributes. The physical configuration, however, needs to set these values in each router connected by the configured OSPF link. In the case of a point-to-point link, this means two routers. However, in other cases such as broadcast or Non-Broadcast Multiaccess (NBMA), there may be more than two routers. Furthermore, if more OSPF links are targeted, the number of target routers is multiplied. Considering the two most important link-scope OSPF parameters, the Hello- and DeadInterval, the administrator must define the new value for each target link. There are logically two parameters to change, but the administrator has to access several routers and set these two values in each router. The difference between the theoretically needed configuration effort (setting two parameter in this example) and the real configuration effort (setting two parameters in several routers with the same values) can be quite burdensome. In addition, the network administrator has to do the same thing on several routers several times. This increases the possibility of human errors in the network configuration. It would be advantageous to have a configuration method that decreases the workload of the network administrator, and decreases the likelihood of human errors occurring in the network configuration.

Sequencing Problems: Another and more important problem is the sequencing problem. The management of a large-scale IP network will most likely be centralized rather than distributed. In general, since only a few network operation centers are responsible for the network, configuration changes (element configuration management) are performed from these centers. Consequently, it is very important to keep the IP connectivity with each target router during an operation. In a small network, where the number of target routers is low, this may not be a big problem. However, when the number of routers is on the order of several hundred, the sequence of element configurations is important. To understand the problem, it is necessary to recall how the OSPF protocol handles links (i.e., adjacencies).

Neighboring OSPF routers build up adjacencies. This channel is used to communicate, to advertise known routes, and to synchronize an OSPF database. Without proper communication, some connections cannot be used by the OSPF, and certain routes are not available for routing calculation. Therefore, these routes are not available for traffic. Thus, some routers, hosts, or sub-networks can be inaccessible from certain points of the network. OSPF adjacencies are crucial for proper OSPF routing. Establishing OSPF adjacencies are based on the link-scope attributes. The general rule is that these parameters must have consistent values. On a point-to-point link, both neighbor routers must have consistent OSPF link-scope attributes for the OSPF link. On a broadcast, NMBA, or point-to-multipoint connection, adjacency is established between neighbors advertising consistent link-scope values. If a participant router advertises different values than other routers, the others do not establish adjacency with it, and the participant router does not establish adjacency with the others.

It should also be understood how an OSPF link-scope parameter is changed on an OSPF link. When the network administrator wants to change a link-scope attribute on a working OSPF link and access one endpoint of it, the administrator has to consider the fact that when the link-scope attribute is changed, the OSPF link can be lost until the other endpoint(s) have consistent values. An important factor is the link configuration time, which is the time between the first router access and the last parameter setting in the last router on the link. The probability of link loss depends on the original Hello-, DeadInterval and this configuration time. The transfer rate between the neighbor routers is negligible. In some circumstances the link may remain intact during the operation, while in other circumstances, the link may be temporarily lost until a new one is established with the new link-scope values. This behavior is important when the link to be configured is on a tree part of the network.

FIG. 1 is a simplified network diagram illustrating the sequencing problem experienced with the prior art. In the illustrated case, the first access is made from the management station 11 to the nearest router R-1 12, where the desired link-scope change is performed. However, if the link is lost before accessing the other end, then the management station cannot reach the farthest router R-3 14 or possibly the intermediate router R-2 13. Therefore, the management station cannot set the new link-scope values in the farthest router R-3, and the new link cannot be established. Thus, random configuration order can easily lead to permanent router loss. It would be advantageous to have a configuration method that solves the sequencing problem and avoids the loss of routers when configuring the network.

Long Operation Time: Considering a large-scale scenario, where many links are targeted for link-scope value change, and consequently many routers are to be configured, the operation time is important. During this configuration operation, it is not recommended to initiate other configuration operations because this operation affects the routing. During the configuration operation, transient routing changes may occur when some target links are temporarily lost. Configuring the target routers in the traditional way (one-by-one and sequentially) can lead to long operation time. It would be advantageous to have a configuration method that reduces the operation time associated with network configuration.

Cancellation and Error Handling: When the network operator changes his mind or realizes that he started an incorrect configuration operation, he may want to cancel it. The safest solution is not to cancel, of course, and let the operation finish. In this case, however, he may have to perform a great deal of additional configuration just to return to the previous state. Thus, the ability to cancel a configuration operation is a useful addition, but its realization is not straightforward. The problem with cancellation is that there are times when the configuration operation cannot be cancelled. If the operation is canceled after an endpoint of a link is configured, but before the other end point(s) is/are configured, the link will be lost. This is more likely to occur when many links are configured in parallel. Thus, when cancellation is initiated, any links where configuration has started must be finished, but the configuration of additional links should not be started. Proper cancellation with traditional methods is not a major problem, but in a software-based solution, especially in parallel execution, this should be carefully considered.

Another important consideration is that some element management operations may fail for several reasons. If an error of this type happens, the operation should stop in the same manner as a cancellation. However, merely stopping is not enough. It is also important that the situation causing the error be handled from the central management station. However, with prior art solutions, this is not always possible. With random configuration, a situation can easily result in which the central management station cannot do anything to solve the error, and a technician must correct the error manually at the failed router.

The solution proposed in the Krishnan paper (referred to above) calculates the link and router sequence based upon the current routing. Having forward and backward routes between the management station and the target routers, it builds a tree that defines the sequence. The tree is walked from the leaves to the root. Significant features and limitations of the Krishnan solution are (1) only symmetric routing is considered; (2) routing information is obtained from the routers themselves; (3) no cancellation is considered; and (4) no error handling is considered.

It would be advantageous to have an IP configuration method that solves the problems discussed above. The present invention provides such a method.

SUMMARY OF THE INVENTION

The present invention is a method of link-scope configuring Open Shortest Path First (OSPF) links from a centralized management node in an IP network. The method provides (1) a solution for the sequencing problem; (2) fast operation time with parallel execution; (3) proper cancellation; (4) good error handling; and (5) simpler sequence calculation than prior art solutions.

Thus, in one aspect, the present invention is directed to a method of configuring an IP-based network having at least one management station, a set of network nodes, and communication links between the network nodes and between the management station and the network nodes. The method includes the steps of preparing an OSPF topology graph of the network; identifying a set of target links to be configured; classifying the target links into N disjoint subsets, $T_1$-$T_N$; and configuring the links from each subset in parallel, starting with subset $T_1$ and sequentially handling each subset one-by-one. The target links may be classified by removing non-target links that are not to be configured from the OSPF topology graph, determining dependencies between the links remaining in the OSPF topology graph, and classifying the target links into the subsets based upon the dependencies between the links.

The dependencies between the links may be determined by building a LinkGraph. The LinkGraph may be built by placing a new node in the LinkGraph for each target link in the OSPF topology graph. For each node placed in the LinkGraph, a full mesh of neighboring nodes is created from the OSPF topology graph. This followed by adding to the LinkGraph, a node representing the management station in the OSPF topology graph; and connecting the node representing the management station to the links that originated from the management station in the OSPF topology graph.

The target links may be classified into the subsets based upon the dependencies between the links by building a LinkTree from the LinkGraph. The LinkTree may be built by designating the node representing the management station as a first starting point. Then, all of the links connecting the first starting point to nodes adjacent to the first starting point are added to the LinkTree. A node adjacent to the first starting point is then selected as a second starting point. This selection may be made by selecting an adjacent node having the largest number of neighboring nodes that are not yet added to the LinkTree (if there is an adjacent node with more neighboring nodes than any other adjacent node). If more than one adjacent node have the largest number of neighboring nodes that are not yet added to the LinkTree, the second starting point is arbitrarily selected from the adjacent nodes having the largest number of neighboring nodes.

The LinkTree is continued by adding all of the links originating from the second starting point, except for links already in the LinkTree, and selecting another node in the LinkTree as a third starting point. The third starting point may be selected by selecting a node having the largest number of neighboring nodes that are not yet added to the LinkTree (if there is a node in the LinkTree with more neighboring nodes than any other node). If more than one node have the largest number of neighboring nodes that are not yet added to the LinkTree, the node having the largest number of neighboring nodes that is the farthest from the first starting point is selected as the third starting point. If more than one node have the largest number of neighboring nodes that are not yet added to the LinkTree, and all of the nodes having the largest number of neighboring nodes are the same distance from the first starting point, the third starting point is arbitrarily selected from the nodes having the largest number of neighboring nodes.

The LinkTree is continued by adding all of the links originating from the third starting point, except for links already in the LinkTree. If all of the nodes of the LinkGraph have been added to the LinkTree, all of the links in the LinkTree are classified into a disjoint subset $T_i$. It is then determined whether there are any target links that did not get added to the LinkTree. If so, a link subgraph is created comprising the target links that did not get added to the LinkTree, and the above steps are repeated to create a disjoint subset $T_{i+1}$. When all of the subsets are created, the links from each subset may be configured in parallel by constructing in the OSPF topology graph, a skeleton comprising the non-target links not being configured; and configuring in parallel, the nodes for all target links at the same level, provided that the last-configured node is in the skeleton.

DETAILED DESCRIPTION OF EMBODIMENTS

The present invention provides an improved method of configuring link-scope-type managed objects in IP-based networks from a centralized management node. An exemplary embodiment is described in terms of the Open Shortest Path First (OSPF) protocol because OSPF has very clear link-scope, router-scope, and area-scope managed objects to represent the problem of configuring link-scope parameters. Accessing the routers for configuration can be done by direct connection or remotely. For direct connection, a network administrator's terminal, console, or workstation has a direct connection to the router. The connection is made independently from the managed IP infrastructure, for example, by using a serial console connection. For remote configuration, the network administrator accesses the routers from a machine connected to the router via the managed IP network, for example using telnet to log into the router. The preferred embodiment of the present invention provides a method of performing remote configuration.

In today's complex, large-scale IP networks, network configuration usually involves configuring a network functionality that can be considered as a logical entity, such as services, paths, protocols such as OSPF, or subsets of these. Thus, a large number of configuration operations are performed when configuring many routers. So when the network operator desires to make a change in the network configuration, he must perform several element configuration operations. A configuration operation that is relevant to more than one router is called a multi-target operation. An example is when the network operator wants to change the OSPF HelloInterval setting on several OSPF links in the network. The preferred embodiment of the present invention provides a method of performing multi-target operations.

The present invention may be implemented in software. This management software provides OSPF link-scope operation for the network administrator. As a result, the administrator only needs to define the target links and the new values of the link-scope parameter, and the software does the rest. Therefore, in the preferred embodiment, the present invention provides an implementable software solution for remote, multi-target link-scope OSPF configuration.

The present invention works on any topology and any routing (symmetric and asymmetric). The invention accelerates the configuration operation by finding, in large-scale complex networks, a maximal number of target links that can be configured in parallel, even when there is no topological dependence between them.

Figure 1:
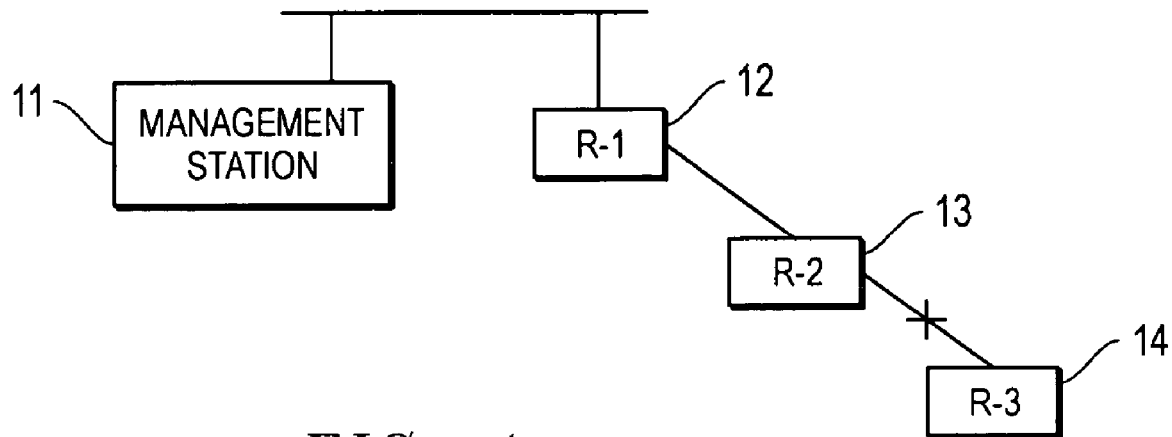
FIG. 1 (Prior Art) is a simplified network diagram illustrating the sequencing problem experienced with the prior art.
Figure 2:
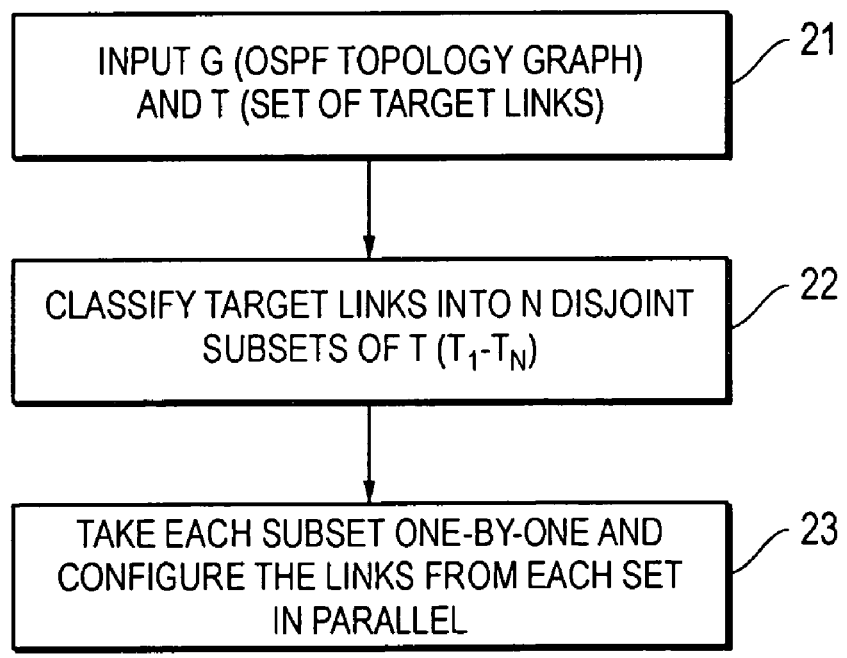
FIG. 2 is a flow chart illustrating the steps of an overall algorithm in a preferred embodiment of the method of the present invention.

FIG. 2 is a flow chart illustrating the steps of an overall algorithm in a preferred embodiment of the method of the present invention. The invention implements an algorithm that configures selected target links in as few steps as possible by configuring those links in parallel. The algorithm is a greedy graph algorithm that, at step 21, takes G (the OSPF topology graph of the network) and T (the set of the target links) as inputs. At step 22, the algorithm classifies the target links into N disjoint subsets of T, $T_1$-$T_N$. After the classification, the algorithm takes the subsets one-by-one at step 23, starting with $T_1$, and configures their elements in parallel.

Figure 3:
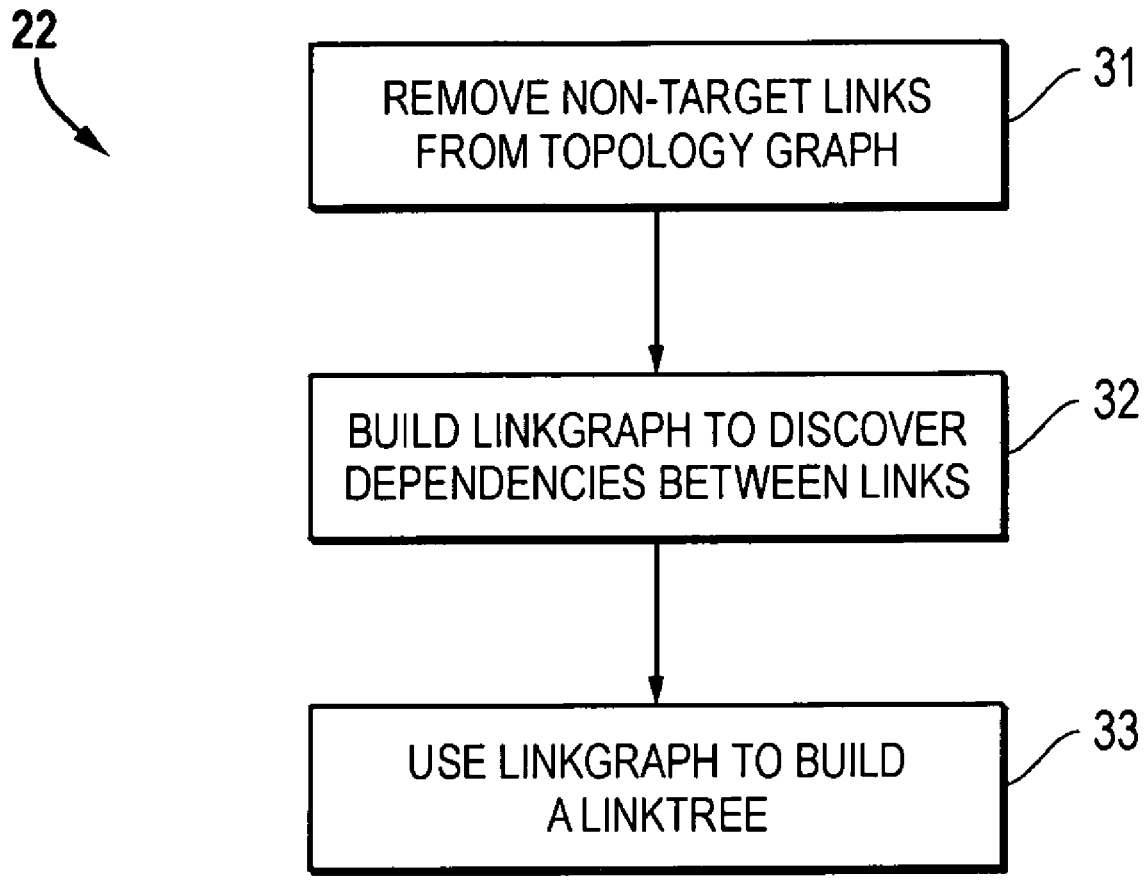
FIG. 3 is a flow chart illustrating the steps of a classification algorithm in a preferred embodiment of the method of the present invention.

FIG. 3 is a flow chart illustrating the steps of a classification algorithm 22 in a preferred embodiment of the method of the present invention. The classification algorithm is a recursive algorithm, and is an important part of the overall algorithm. At step 31, the classification algorithm removes the non-target links from the topology graph, G, by deleting the router nodes connected with non-target links in the graph. At step 32a, a so-called LinkGraph is built to discover the dependencies between the links. A new node is put to a graph for each target link, and a full mesh of the neighbors of a router node in the original graph is created for each router (see the example in FIGS. 6-10 below). Finally, at step 33, the algorithm uses the LinkGraph to build a LinkTree as shown and described in FIGS. 4A-4B.

Figure 4A:
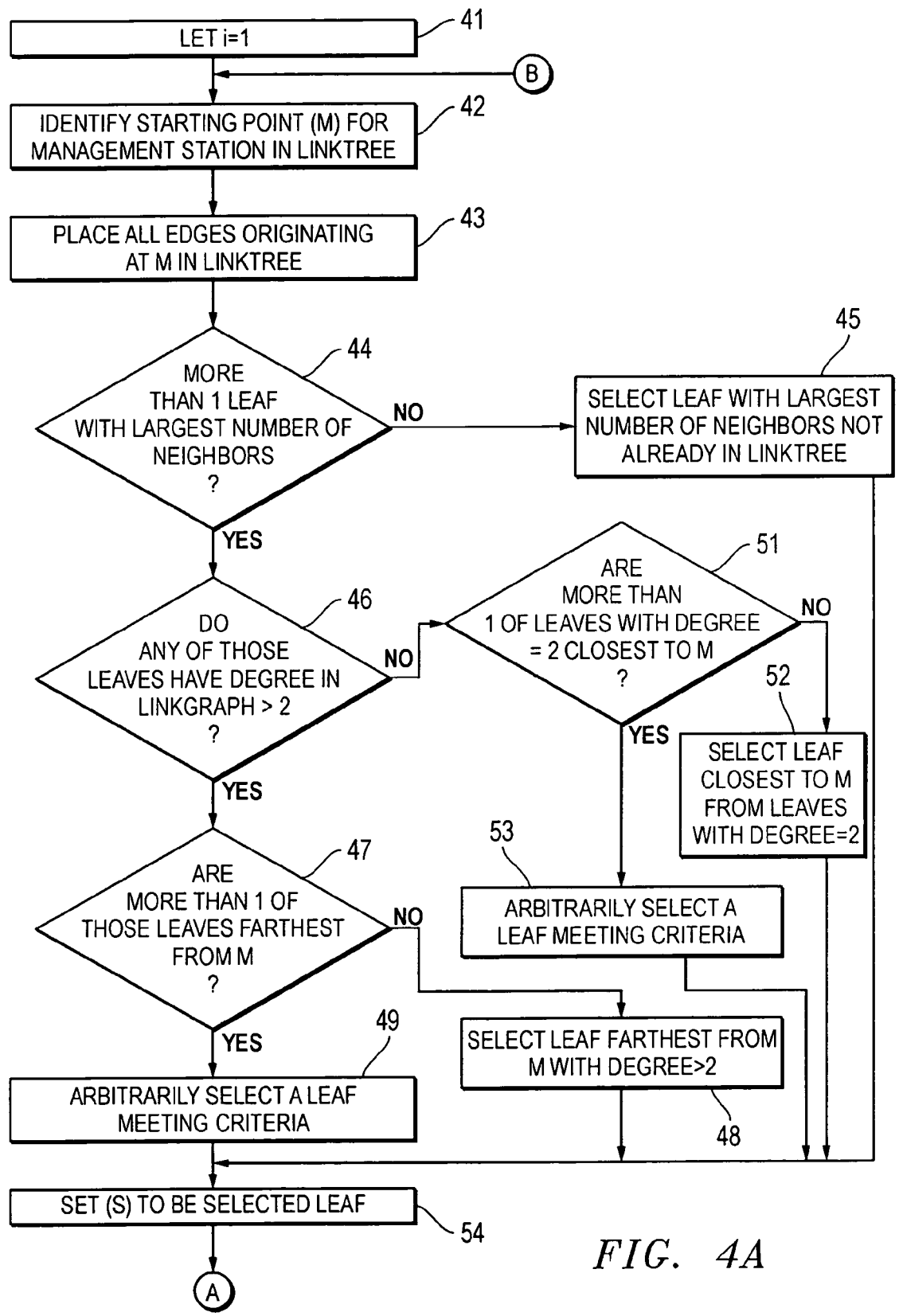
FIGS. 4A-4B are portions of a flow chart illustrating the steps of an algorithm for building a LinkTree from a LinkGraph.
Figure 4B:
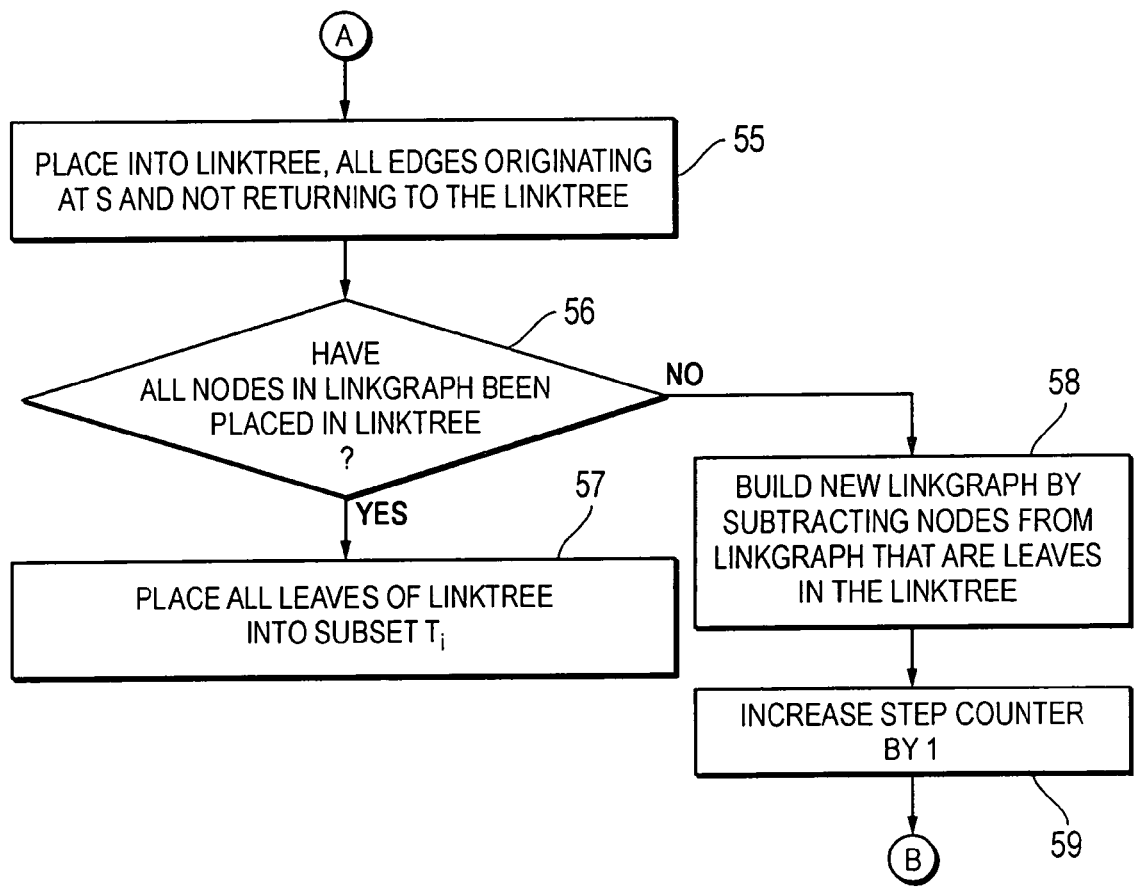

FIGS. 4A-4B are portions of a flow chart illustrating the steps of an algorithm 33 for building the LinkTree from the LinkGraph. At step 41, a counter I is set to 1. At step 42, the node representing the management station, M, is identified as the starting point and put into the LinkTree. At step 43, all edges originating from M are put into the LinkTree. At step 44, it is determined whether more than one of the leaves (nodes) that are not already in the LinkTree have the largest number of neighboring nodes. If not, and thus a single leaf has the largest number of neighbors, then the leaf with the largest number of neighbors is selected at step 45 to be the variable S. If more than one of the leaves has an equal, largest number of neighbors, the method moves from step 44 to step 46 where it is determined whether any of the leaves with the largest number of neighbors have a degree in the LinkGraph greater than two. If so, the method moves to step 47 where it is determined whether there is a single leaf with a degree greater than two that is farthest from M, or a plurality of leaves with a degree greater than two that are farthest from M. If there is a single leaf with a degree greater than two that is farthest from M, the method moves to step 48 where the single leaf with a degree greater than two that is farthest from M is selected to be the variable S. However, if there are a plurality of leaves with a degree greater than two that are farthest from M, the method moves to step 49 where a leaf is arbitrarily selected to be the variable S from the plurality of leaves meeting these criteria.

Returning to step 46, if it is determined that none of the leaves having the largest number of neighbors have a degree in the LinkGraph greater than two (i.e., there are several leaves with degree equal to two), the method moves to step 51 where it is determined whether there is a single leaf with a degree equal to two that is closest to M, or a plurality of leaves with a degree equal to two that are closest to M. If there is a single leaf with a degree equal to two that is closest to M, the method moves to step 52 where the single leaf with a degree equal to two that is closest to M is selected to be the variable S. However, if there are a plurality of leaves with a degree equal to two that are closest to M, the method moves to step 53 where a leaf is arbitrarily selected to be the variable S from the plurality of leaves meeting these criteria. Having thus selected a leaf, either at step 45, 48, 49, 52, or 53, the method proceeds to step 54 where S is set to be the selected leaf. The method then moves to FIG. 4B.

At step 55, the method places into the LinkTree, all edges originating from S and not returning to the LinkTree. At step 56, it is determined whether all of the nodes in the LinkGraph have been placed into the LinkTree. If so, the method moves to step 57 where all of the leaves of the LinkTree are placed into the subset $T_i$. However, if all of the nodes in the LinkGraph have not been placed into the LinkTree, the method moves to step 58 and builds a new LinkGraph by subtracting nodes from the original LinkGraph that have been placed into the LinkTree. At step 59, the step counter (I) is incremented by one (1), and the method then returns to step 42 and repeats the process.

When the original OSPF topology graph consists of only one node that is M, the subsets $T_i$ are defined and ready to be passed to the configuring algorithm.

Figure 5:
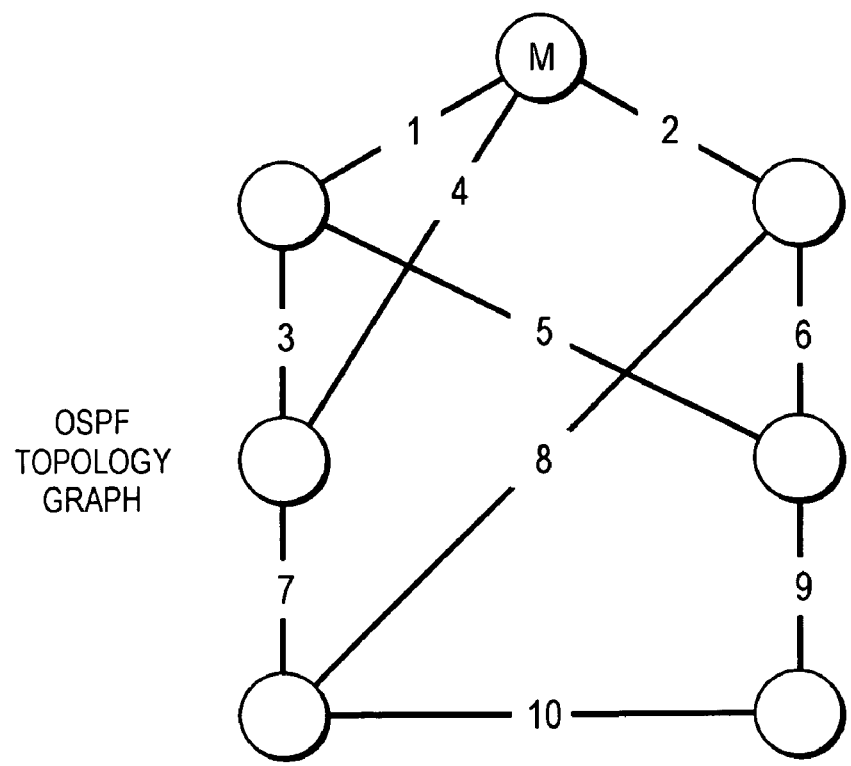
FIG. 5 is an exemplary OSPF topology graph suitable for use with the present invention.
Figure 6:
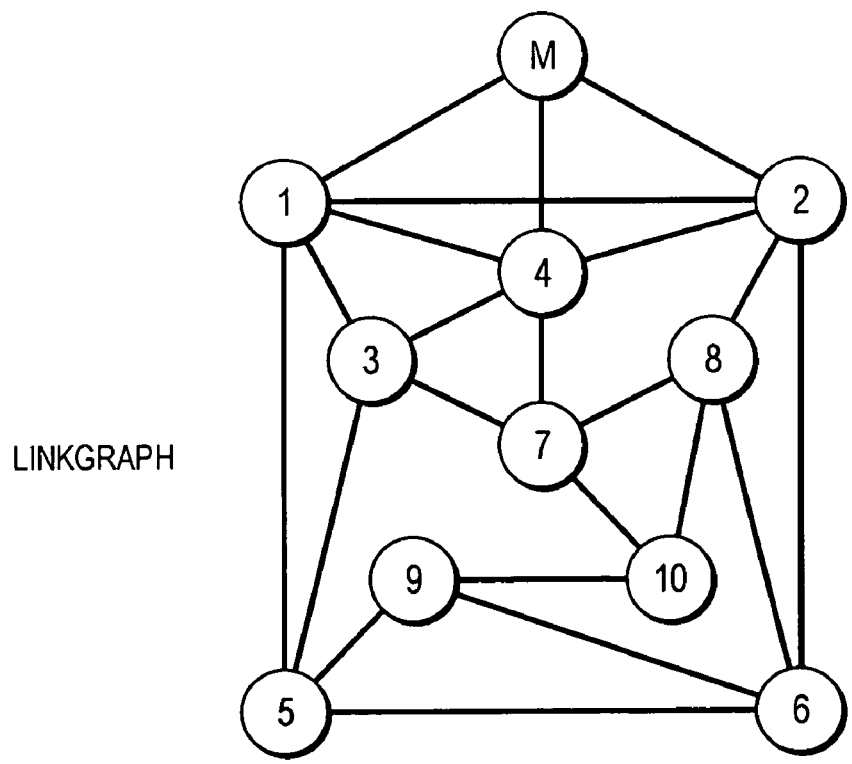
FIG. 6 is an exemplary LinkGraph derived from the OSPF topology graph and utilized to discover the dependencies between the links.

FIG. 5 is an exemplary OSPF topology graph suitable for use with the present invention. In the illustrated example, the links are numbered 1-10. Every link in the network is a target link, so the graph cannot be contracted by deleting the endpoints of non-target links. According to the process shown in FIGS. 4A-4B, the first step is building the LinkGraph to discover the dependencies between the links. The resulting LinkGraph is shown in FIG. 6. The LinkGraph is then utilized to construct a LinkTree following the rules above.

Figure 7:
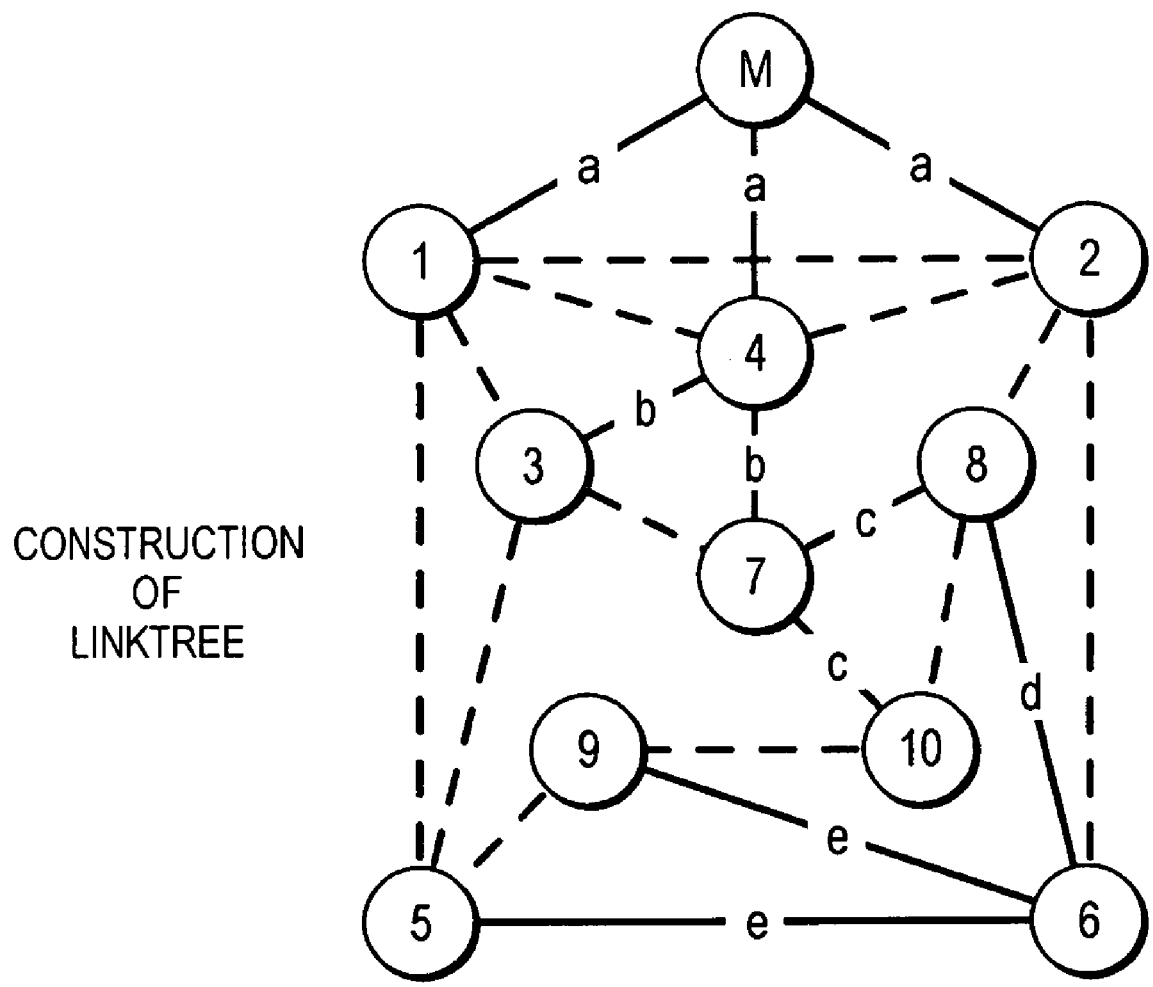
FIG. 7 illustrates the process of constructing a LinkTree from the exemplary LinkGraph of FIG. 6.

FIG. 7 illustrates an example of the process of constructing the LinkTree from the LinkGraph of FIG. 6 in accordance with the procedures of FIGS. 4A-4B. First, the node M is selected, and the edges (M,1), (M,2) and (M,4) are added to the LinkTree. These links are labeled "a" in FIG. 7 to designate that they are added first to the LinkTree. The next step is investigating how many non-LinkTree node neighbors the leaves of the actual LinkTree have. In this case, node 1 has two such neighbors (node 3 and node 5); node 2 has two such neighbors (node 6 and node 8); and node 4 has two such neighbors as well (node 3 and node 7). Thus, a decision must be made regarding which one of the three nodes (nodes 1, 2, and 4) should be set to S. All three nodes are one step deep in the LinkTree (i.e., degree equal to two), and no single node is closest to M, so a node is arbitrarily selected in accordance with step 53 of FIG. 4A.

In the example illustrated, node 4 is selected and set to S. Thus, the next edges added to the LinkTree are (4,3) and (4,7). These links are labeled "b" in FIG. 7 to designate that they are added second to the LinkTree. In the next step, the leaves of the actual LinkTree are again investigated to determine which node has the largest number of non-LinkTree node neighbors. At this point, it is determined that node 1 and node 3 both have one non-LinkTree node neighbor, while node 7 and node 2 both have two non-LinkTree node neighbors. In this case, however, node 7 is two steps deep in the LinkTree (i.e., degree greater than two) while node 2 is only one step deep (i.e., degree equal to two). Therefore, in accordance with step 48 of FIG. 4A, node 7 is selected to be S, and edges (7,8) and (7,10) are added to the LinkTree. These links are labeled "c" in FIG. 7 to designate that they are added third to the LinkTree.

Following the same procedure, the leaves of the actual LinkTree are again investigated to determine which node has the largest number of non-LinkTree node neighbors. At this point, it is determined that node 8 and node 10 both have one non-LinkTree node neighbor. Both nodes are three steps deep in the LinkTree (i.e., degree greater than two), so a node is arbitrarily selected in accordance with step 49 of FIG. 4A. In the example illustrated, node 8 is selected and set to S, and edge (8,6) is added to the LinkTree. Edge (8,6) is labeled "d" in FIG. 7 to designate that it is added fourth to the LinkTree.

In the next step, the leaves of the actual LinkTree are again investigated to determine which node has the largest number of non-LinkTree node neighbors. At this point, it is determined that node 6 has the most non-LinkTree node neighbors, and is selected as S in accordance with step 45 of FIG. 4A. Edges (6,9) and (6,5) are then added to the LinkTree, and are labeled "e" in FIG. 7 to designate that they are added fifth to the LinkTree. This completes the construction of the LinkTree as illustrated in FIG. 7.

Figure 8:
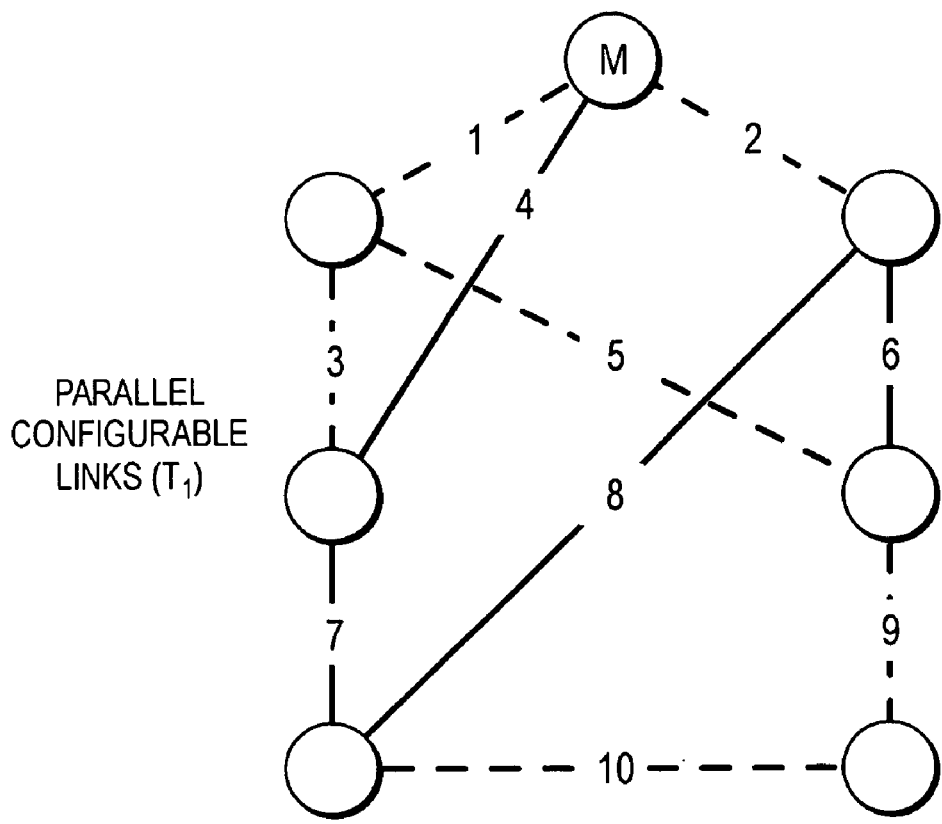
FIG. 8 illustrates the LinkTree of FIG. 7 illustrating the links classified in a first subset $T_1$.
Figure 9:
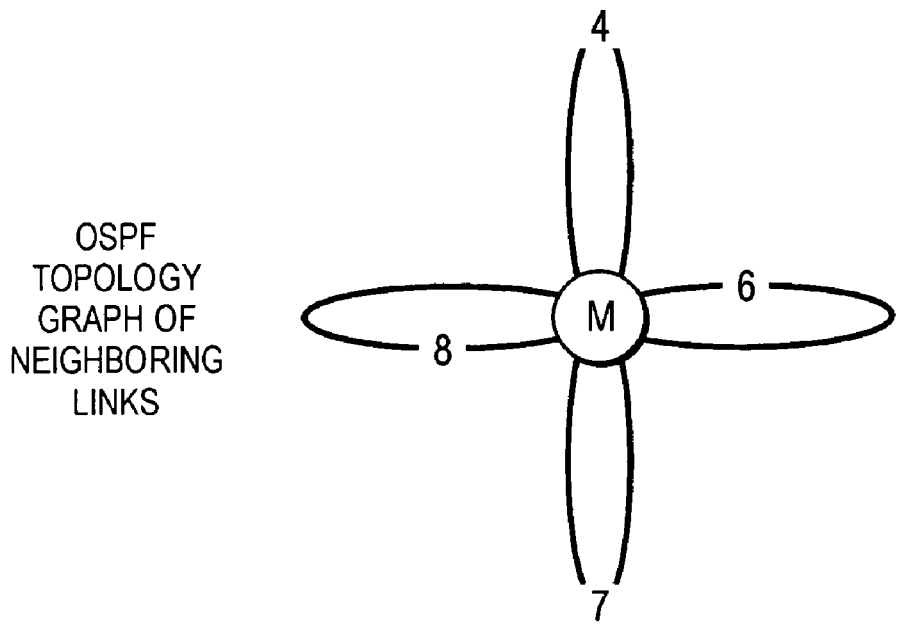
FIG. 9 illustrates a graph resulting when neighbors of the links in subset $T_1$ are removed.
Figure 10:
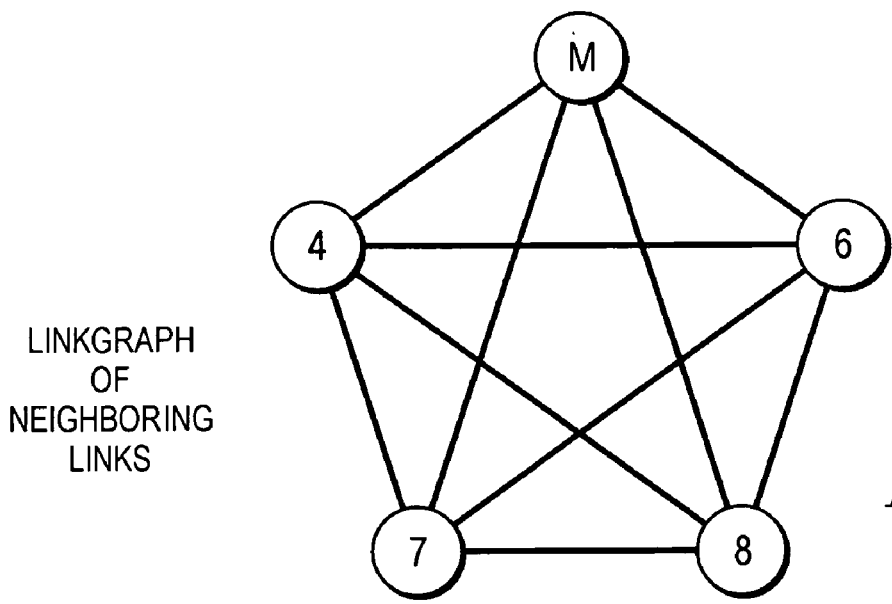
FIG. 10 is a LinkGraph of the graph of FIG. 9.
Figure 11:
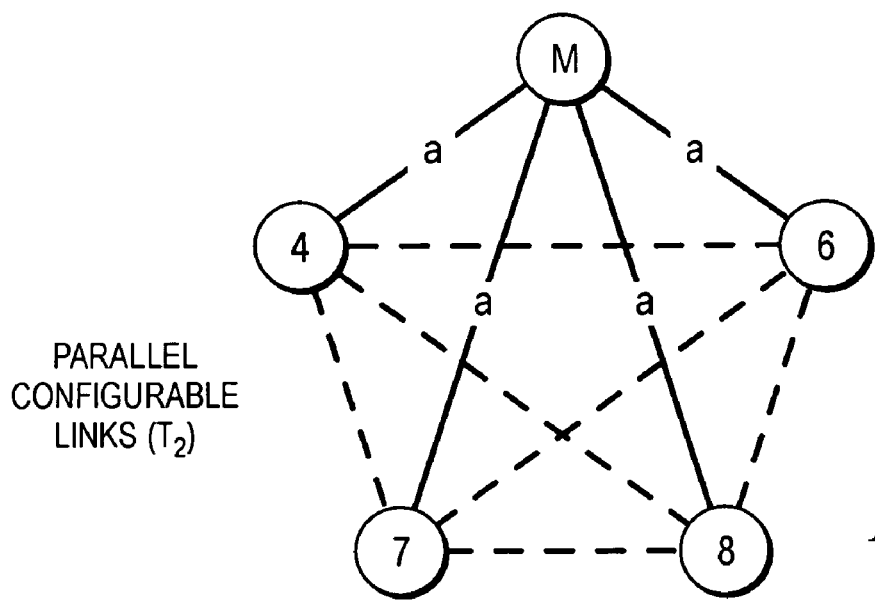
FIG. 11 is a LinkTree built from the LinkGraph of FIG. 10.

After the LinkTree is built, the set of parallel configurable links is determined by finding the leaves in the LinkTree. Thus $T_1$ (i.e., the set of links that are configured in the first step) is {1,2,3,5,9,10}. These links are shown in FIG. 8. The neighbors of these links are then deleted. The resulting graph is shown in FIG. 9, and its LinkGraph is shown in FIG. 10. In the next step, the LinkGraph is updated, and the resulting LinkTree is shown in FIG. 11. Thus, set $T_2$ is {4,6,7,8}.

The element management operations are performed in the sequence governed by the LinkGraph. The links in the same levels are configured in parallel. The sequence between the routers connected by the actual target link is derived from the graph G in the following manner. First a Skeleton, that is, the subgraph built up of the non-target links and the links not being configured, is constructed in the original OSPF topology graph. The result is a connected graph. During the configuration of a link, the only constraint in the sequence of the router modifications is that the last configured router must be in the Skeleton. The sequence of the other routers is arbitrary; their configuration can be done in parallel. The last router can only be modified after all other routers attached to the link are successfully configured. Testing has shown that the algorithm always accurate when each target link belongs to the same area.

Cancellation is provided by applying the following implementation rule. In an actual stage of the algorithm, some target links are configured in parallel. Routers are accessed, as described above, and the algorithm does not step to the next stage ($T_{i+1}$) until each link in the actual links is not configured successfully. When cancellation is initiated the actual links that have already configured router, must be configured entirely.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of link-scope configuring an Internet Protocol (IP)-based network having at least one management station, a set of network nodes, and a plurality of communication links between the network nodes and between the management station and the network nodes, said method comprising the steps of:

preparing a topology graph of the network;
identifying a set of target links to be configured;
classifying the target links into N disjoint subsets, $T_1$-$T_N$;
establishing a communication connection with network nodes requiring configuration; and
configuring in the network nodes, the links from each subset in parallel, starting with subset $T_1$ and sequentially handling each subset one-by-one.

2. The method of claim 1, wherein the step of preparing a topology graph includes preparing a topology graph based on the Open Shortest Path First (OSPF) routing protocol, and the step of classifying the target links includes the steps of:

removing from the OSPF topology graph, non-target links that are not to be configured:
determining dependencies between the links remaining in the OSPF topology graph; and
classifying the target links into the subsets based upon the dependencies between the links.

3. The method of claim 2, wherein the step of determining dependencies between the links includes building a LinkGraph, said step of building a LinkGraph including the steps of:

for each target link in the OSPF topology graph, placing a new node in the LinkGraph;
for each node placed in the LinkGraph, creating a full mesh of neighboring nodes from the OSPF topology graph;
adding to the LinkGraph, a node representing the management station in the OSPF topology graph; and
connecting the node representing the management station to the links that originated from the management station in the OSPF topology graph.

4. A method of link-scope configuring an Internet Protocol (IP)-based network having at least one management station, a set of network nodes, and a plurality of communication links between the network nodes and between the management station and the network nodes, said method comprising the steps of:

preparing a topology graph of the network based on the Open Shortest Path First (OSPF) routing protocol;
identifying a set of target links to be configured;
classifying the target links into N disjoint subsets, $T_1$-$T_N$, said classifying step including removing from the OSPF topology graph, non-target links that are not to be configured; determining dependencies between the links remaining in the OSPF topology graph; and classifying the target links into the subsets based upon the dependencies between the links;
establishing a communication connection with network nodes requiring configuration; and
configuring in the network nodes, the links from each subset in parallel, starting with subset $T_1$ and sequentially handling each subset one-by-one;
wherein the step of determining dependencies between the links includes building a LinkGraph through the steps of;
for each target link in the OSPF topology graph, placing a new node in the LinkGraph;
for each node placed in the LinkGraph, creating a full mesh of neighboring nodes from the OSPF topology graph;
adding to the LinkGraph, a node representing the management station in the OSPF topology graph; and
connecting the node representing the management station to the links that originated from the management station in the OSPF topology graph; and
wherein the step of classifying the target links into the subsets based upon the dependencies between the links includes building a LinkTree from the LinkGraph, said step of building a LinkTree including the steps of:

(a) designating the node representing the management station as a first starting point;
(b) adding to the LinkTree, all of the links connecting the first starting point to nodes adjacent to the first starting point;
(c) selecting a node adjacent to the first starting point, said step of selecting an adjacent node including the steps of:
(c)(1) selecting as a second starting point, an adjacent node having the largest number of neighboring nodes that are not yet added to the LinkTree, if there is an adjacent node with more neighboring nodes than any other adjacent node: and
(c)(2) if more than one adjacent node have the largest number of neighboring nodes that are not yet added to the LinkTree, arbitrarily selecting as the second starting point, an adjacent node from the adjacent nodes having the largest number of neighboring nodes;
(d) adding to the LinkTree, all of the links originating from the second starting point, except for links already in the LinkTree;
(e) selecting as a third starting point, a node in the LinkTree, said step of selecting a node in the LinkTree including the steps of:
(e)(1) selecting a node in the LinkTree having the largest number of neighboring nodes that are not yet added to the LinkTree, if there is a node in the LinkTree with more neighboring nodes than any other node:

(e)(2) if more than one node have the largest number of neighboring nodes that are not yet added to the LinkTree, selecting as the third starting point, a node from the nodes having the largest number of neighboring nodes that is the farthest from the first starting point; and (e)(3) if more than one node have the largest number of neighboring nodes that are not yet added to the LinkTree, and all of the nodes having the largest number of neighboring nodes are the same distance from the first starting point, arbitrarily selecting as the third starting point, a node from the nodes having the largest number of neighboring nodes;

(f) adding to the LinkTree, all of the links originating from the third starting point, except for links already in the LinkTree;

(g) determining whether all of the nodes of the LinkGraph have been added to the LinkTree;

(h) if all of the nodes of the LinkGraph have been added to the LinkTree, classifying all of the links in the LinkTree into a disjoint subset $T_i$.

5. The method of claim 4, further comprising the steps of: determining whether there are any target links that did not get added to the LinkTree;

if there are target links that did not get added to the LinkTree, creating a link subgraph comprising the target links that did not get added to the LinkTree; and repeating steps (a) through (h) to create a disjoint subset $T_{i-1}$.

6. The method of claim 5, wherein the step of configuring the links from each subset in parallel includes the steps of:

constructing in the OSPF topology graph, a skeleton comprising the non-target links not being configured; and configuring in parallel, the nodes for all target links at the same level, provided that the last-configured node is in the skeleton.

7. A management station for link-scope configuring an Internet Protocol (IP)-based network having a set of network nodes, and a plurality of communication links between the network nodes and between the management station and the network nodes, said management station comprising:

means for preparing a topology graph of the network;

means for identifying a set of target links to be configured;

means for classifying the target links into N disjoint subsets, $T_1$-$T_N$;

means for establishing a communication connection with network nodes requiring configuration; and means for configuring in the network nodes, the links from each subset in parallel, starting with subset $T_1$ and sequentially handling each subset one-by-one.

8. The management station of claim 7, wherein the means for preparing a topology graph includes means for preparing a topology graph based on the Open Shortest Path First (OSPF) routing protocol.

9. The management station of claim 8, wherein the means for classifying the target links includes:

means for removing from the OSPF topology graph, non-target links that are not to be configured;

means for determining dependencies between the links remaining in the OSPF topology graph; and means for classifying the target links into the subsets based upon the dependencies between the links.

* * * * *

UNITED STATES PATENT AND TRADEMARK OFFICE
CERTIFICATE OF CORRECTION

| | | |
|---|---|---|
| PATENT NO. | : 7,327,695 B2 | Page 1 of 2 |
| APPLICATION NO. | : 10/742731 | |
| DATED | : February 5, 2008 | |
| INVENTOR(S) | : Molnar et al. | |

Figure 12:
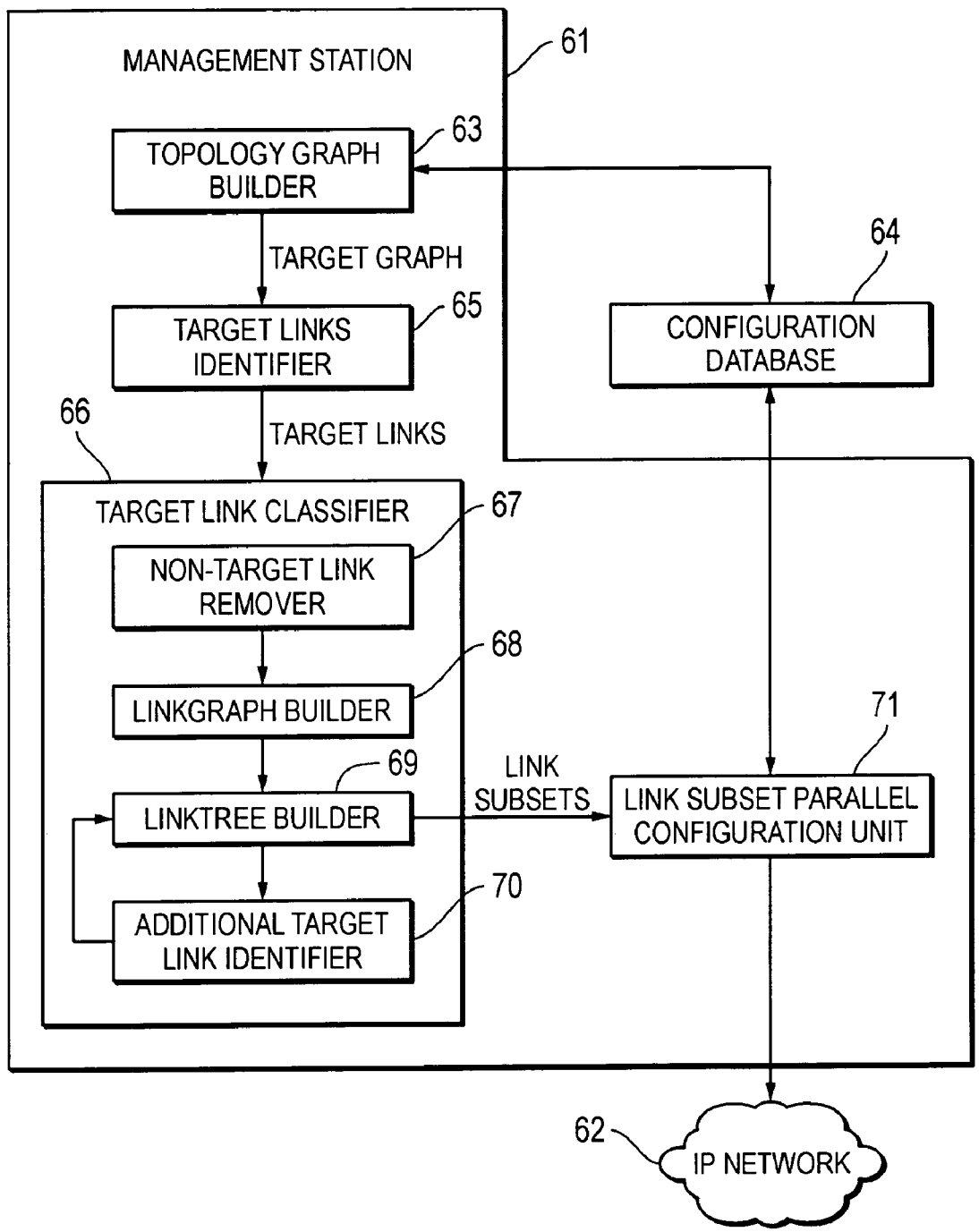

It is certified that error appears in the above-identified patent and that said Letters Patent is hereby corrected as shown below:

In Column 7, Line 61, below "10." insert -- FIG. 12 is a simplified block diagram of a management station for link-scope configuring an IP network in accordance with the teachings of the present invention. --.

In Column 11, between Lines 21 & 22, insert -- FIG. 12 is a simplified block diagram of a management station 61 for link-scope configuring an IP network 62 in accordance with the teachings of the present invention. The IP network includes a set of network nodes, and a plurality of communication links between the network nodes and between the management station and the network nodes. A topology graph builder 63 obtains configuration information for the IP network, for example from a configuration database 64, which may be internal or external to the management station. The topology graph is sent to a target link identifier 65 that identifies a set of target links from the topology graph to be configured. The identified set of target links is sent to a target link classifier 66 that classifies the target links into N disjoint subsets, $T_1$-$T_N$. Within the target link classifier, a non-target link remover 67 removes links from the topology graph that are not identified as being target links. The reduced topology graph is then passed to a LinkGraph builder 68, which builds a LinkGraph for determining dependencies between the links. The dependencies are then sent to a LinkTree builder 69, which builds a LinkTree for classifying the target links into the N disjoint subsets ($T_1$-$T_N$) based upon the dependencies between the links. An additional target link identifier 70 determines whether there are any additional target links that have not been placed in the link tree, and if so, the LinkTree builder builds another LinkTree in order to classify the remaining target links into subsets.

When all of the target links have been classified into subsets, the link tree builder 69 identifies the subsets, $T_1$-$T_N$, to a link subset parallel configuration unit 71, which configures the IP network links from each subset in parallel, starting with subset $T_1$ and sequentially handling each subset one-by-one through subset $T_N$. When the configuration is complete, the configuration unit updates the configuration database 64. --.

UNITED STATES PATENT AND TRADEMARK OFFICE
CERTIFICATE OF CORRECTION

PATENT NO. : 7,327,695 B2
APPLICATION NO. : 10/742731
DATED : February 5, 2008
INVENTOR(S) : Molnar et al.

It is certified that error appears in the above-identified patent and that said Letters Patent is hereby corrected as shown below:

In Column 13, Line 32, in Claim 5, delete "$T_{i-1}$." and insert -- $T_{i+1}$. --, therefor.

Signed and Sealed this

Thirtieth Day of September, 2008

JON W. DUDAS
*Director of the United States Patent and Trademark Office*